Sept. 27, 1966     R. L. BLAIS     3,275,391
ROLLER BEARING
Filed Feb. 20, 1964
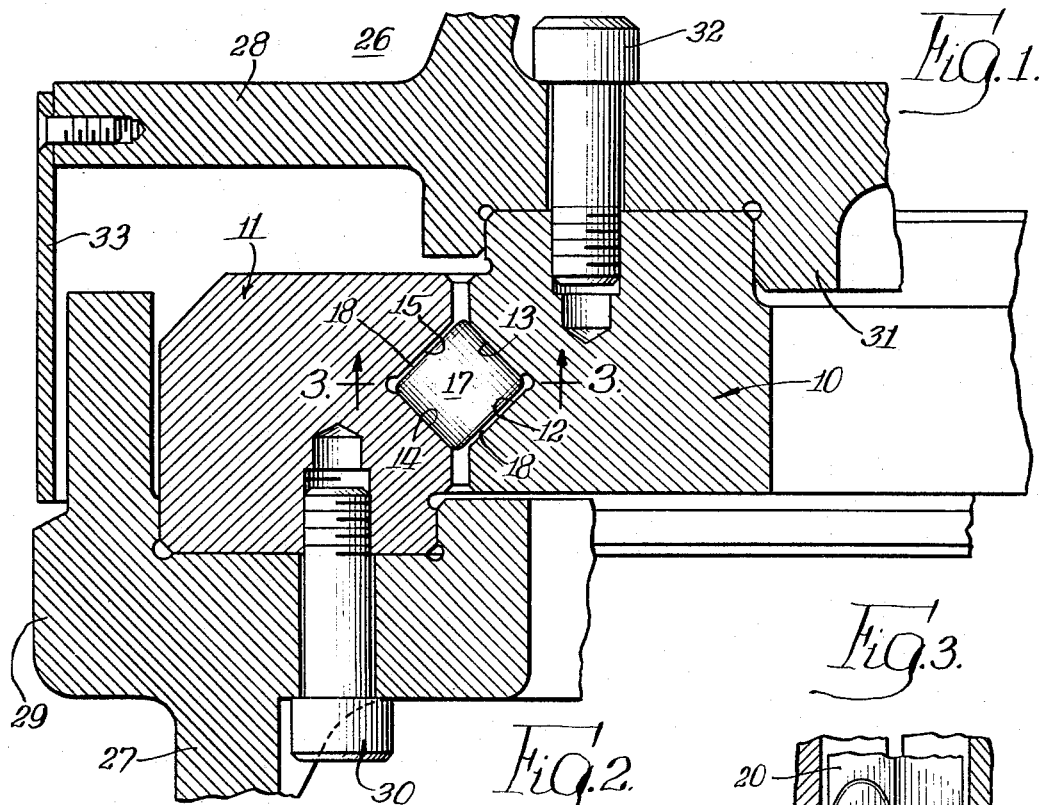
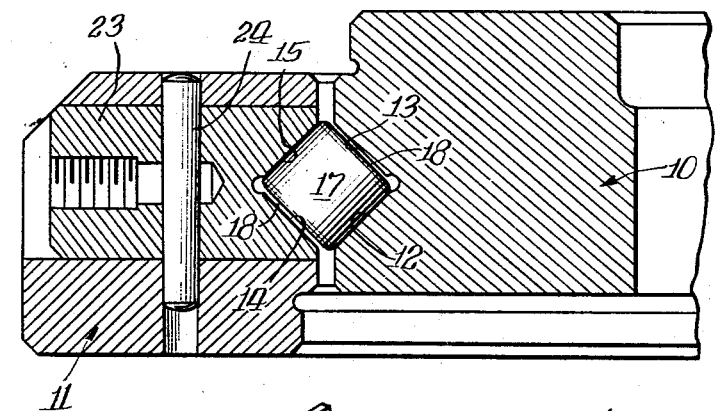
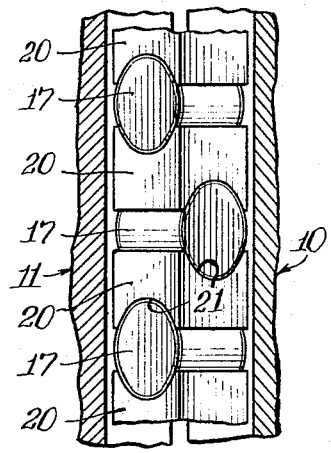
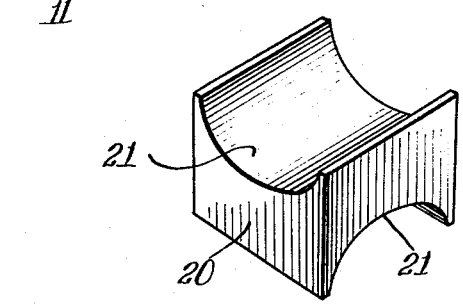
INVENTOR.
Robert L. Blais,
BY
Brown, Jackson, Boettcher & Dienner
Attys.

United States Patent Office 3,275,391
Patented Sept. 27, 1966

3,275,391
ROLLER BEARING
Robert L. Blais, Muskegon, Mich., assignor to The Kaydon Engineering Corporation, Muskegon, Mich., a corporation of Michigan
Filed Feb. 20, 1964, Ser. No. 346,254
5 Claims. (Cl. 308—174)

This invention relates to antifriction bearings, particularly roller bearings adapted to resist both radial and axial thrust and in which the bearing rollers are of uniform diameter and axial extent.

Roller bearings of the general type referred to are well known and extensively used. In all of such known bearings with which I am familiar, either one or both of the races are split and formed in two parts and the rollers are either mounted in an annular cage disposed between the opposed faces of the races, or a full complement of rollers is provided, with no cage. The use of split races incurs the risk of displacement of parts of the assembled bearing and the use of the annular cage reduces the available total contact area between the rollers and the races; both contributing to decreased efficiency of the bearing.

My invention is directed to a bearing which avoids the above noted objections to the mentioned known bearings, with resultant increased efficiency of the bearing. More specifically, in the bearing of my invention each of the races is formed in one piece and the rollers are spaced apart by individual separators disposed therebetween. The unitary one-piece races are more rigid than the known split races and assure greater accuracy in the assembled bearing, and the provision of individual roller separators or spacers gives increased total bearing contact between the rollers and the bearing surfaces of the races; both conducive to increased efficiency of the bearing as compared to the known bearings previously mentioned. Further objects and advantages of my invention will appear from the detail description.

In the drawings:

FIGURE 1 is a radial sectional view through one side of a bearing embodying my invention and a housing therefor, the latter being shown fragmentarily and broken away, with certain parts shown in elevation;

FIGURE 2 is a view similar to FIGURE 1 but taken in a different plane and with the housing omitted;

FIGURE 3 is a fragmentary sectional view taken substantially on line 3—3 of FIGURE 2, with the bearing rollers and the separators shown in elevation; and FIGURE 4 is a perspective view of one of the roller spacers, on an enlarged scale.

The bearing of my invention resists both radial thrust loads and axial thrust loads in either direction. It is well suited for use in precision mounted devices which may be subjected to heavy loads, such as, for example, the rotary tables of heavy duty boring machines, the turrets of gun mounts and analogous devices, though it may be used in many other devices, as will be understood.

Referring to the drawings, the bearing of my invention comprises coaxial inner and outer races 10 and 11, respectively, each of one-piece or unitary construction. The inner race 10 is provided, in its radially outer side, with a concentric V-shaped groove forming axially inner and outer bearing surfaces 12 and 13, respectively, which surfaces are flat axially of race 10. Likewise, the outer race 11 is provided, in its radially inner side, with a concentric V-shaped groove forming axially inner and outer bearing surfaces 14 and 15, respectively, which surfaces are flat axially of race 11. The bearing surfaces 12 and 13 are of equal width and perpendicular to each other, as are the bearing surfaces 14 and 15, which are also of the same width as the surfaces 13 and 12. Accordingly, the grooves in the opposed faces of the races 10 and 11 define between them an annular space or race way which is square in cross section, when the races 10 and 11 are disposed in cooperating relation to each other in the assembled bearing.

The race way between the races 10 and 11 receives a plurality of cylindrical bearing rollers 17 of uniform diameter, all of the same length or axial extent and having flat ends perpendicular to their axes. The axial extent or length of the respective rollers 17 is slightly less than its diameter. Accordingly, when a roller 17 is in bearing contact with two opposed bearing surfaces of the race way the flat ends of the roller will be spaced a short distance from the other two bearing surfaces of the race way. Within the broader aspects of my invention, the ends of the rollers may be crowned. Preferably they are flat, as shown, to provide increased length of roller contact with the bearing surfaces, as compared to rollers having crowned ends. Referring to FIGURE 1, the roller 17 is shown in bearing contact with the bearing surfaces 13 and 14, with its ends spaced, at 18, from the bearing surfaces 12 and 15. When the bearing is placed under load the races 10 and 11 are contracted slightly putting the rollers 17 under radial pressure and causing slight axial extension thereof. Such axial extension of the rollers 17 is not sufficient to cause contact of the ends of the rollers with the adjacent bearing surfaces, the difference between the axial extent or length and the diameter of the respective rollers being adequate to guard against that. Accordingly, when the bearing is under load one end of the respective rollers may be in light contact with the adjacent bearing surface with the other end spaced from the bearing surface adjacent that end. At no time are both ends of the respective rollers in contact with both of the adjacent bearing surfaces. That assures spacing of either one or both ends of the respective rolls from the corresponding bearing surfaces of the races when the bearing is under load. Such spacing effectively guards against pressure contact between the ends of the rollers and the adjacent bearing surfaces of the races, which would cause objectionable heating and resultant reduced efficiency of the bearing. Further, the spaces between the ends of the rollers and the corresponding bearing surfaces of the races has the additional advantage of permitting slight endwise movement of the rollers, conducive to accurate positioning thereof on the other bearing surfaces, on which the rollers turn, of the races.

The rollers 17 are preferably arranged in two sets or groups, those of one set being inclined axially in one direction, as in FIGURE 1, and those of the other set being inclined axially in the opposite direction, as shown in FIGURE 2. Referring to the latter figure, it will be noted that roller 17 is inclined oppositely to roller 17 of FIGURE 1 and that the ends of roller 17 of FIGURE 2 are spaced from the adjacent bearing surfaces 13 and 14. Ordinarily the rollers 17 in each set are equal in number and the rollers are disposed in alternate relation so that any two adjacent rollers are oppositely inclined. It is to be understood, however, that the rollers 17 may be otherwise arranged as conditions may require, in respect to the number of rollers inclined in one direction and the number inclined in the opposite direction, to suit conditions as to the radial and axial loads or thrusts to which the bearing may be subjected in use.

Preferably, but not necessarily, the rollers are separated or spaced apart by spacers 20, as shown in FIGURE 3. Referring to the latter figure and to FIGURE 4, each of the spacers is a substantially cubi-form block of low carbon steel having in two of its opposite sides an arcuate recess 21. The recesses 21 have a radius slightly greater than that of the rollers 17 and are disposed at right angles to each other. The spacers 20 are disposed between opposed bearing surfaces with the recesses 21 disposed circumferentially of the race way and receiving the two adjacent oppositely inclined rollers. The depth of the recesses 21 is materially less than the diameter of the respective rollers 17 which have full length bearing contact with the bearing surfaces of the race way. As above indicated, the spacers 20 may be omitted, in which case a full complement of rollers 17 may be used and the rollers may be variously arranged in respect to their inclination, as previously noted. The length and the width, respectively, of the spacers 21 is slightly less than the distance between the opposed bearing surfaces of the race way, to guard against binding.

In assembling the bearing, the outer race 11 may be heated to a temperature considerably higher than its normal operating temperature and the inner race 10 may be cooled to a temperature much lower than its normal operating temperature. With the races, at the high and low temperatures indicated and disposed in proper relation to each other, the race way between them is of a cross sectional area greater than that when the races are at normal temperature, due to the expansion of the outer race 11 and the contraction of the inner race 10. That facilitates insertion of the bearing rollers 17 and of the spacers 20, if the latter are used. The rollers 17 and the spacers 20 are inserted into the race way by means of a cylindrical loading plug 23 (FIGURE 2) which fits accurately in a corresponding bore in one of the races, for example the outer race 11. Upon completion of the assembly the plug is fixedly secured, by any suitable means, such as a taper pin 24, in the associated race. When the plug is secured in position its inner end, appropriately formed, is in accurate register with the bearing surfaces of the associated race 10 or 11, as the case may be. Upon return of the races 10 and 11 to normal temperature, the cross sectional area of the race way returns to normal and the bearing rollers 17 then have contact with the bearing surfaces as previously described.

The bearing may be mounted in a suitable housing comprising axially outer and inner sections 27 and 28, respectively. The outer section 27 is provided with a channel rim 29 which snugly receives the outer race 11 suitably secured therein, conveniently by bolts 30. The inner section 28 is provided at one face thereof with spaced annular ribs 31, providing a channel snugly receiving an axial extension 10a of the inner race 10, suitably secured therein, conveniently by bolts 32. An annular plate or apron 33 encloses section 28 and is suitably secured thereto, conveniently by bolts 34. The apron 33 overlaps the outer arm of channel rim 29 in spaced relation thereto, such arm being of reduced thickness for the major portion of its axial extent to that end. As above indicated the housing shown is by way of example only. The housing may be of any suitable construction and the bearing may be mounted therein in any suitable manner.

It will be understood that changes in detail may be made without departing from the field and scope of my invention, and I intend to include all such variations, as fall within the appended claims, in this application in which the preferred form only of my invention is disclosed.

I claim:
1. In a roller bearing, inner and outer races each of unitary construction and having a concentric groove of approximately V-shape in cross section providing two bearing surfaces substantially perpendicular to each other and flat axially of said race, said grooves defining a race way substantially square in cross section providing two pairs of flat inclined bearing surfaces with those of one pair inclined oppositely to those of the other pair, a plurality of cylindrical rollers of uniform diameter in said race way having substantially full length bearing contact with said bearing surfaces, the length of the respective rollers being less than the diameter thereof in extent such that the length of the respective rollers when the bearing is under load is less than the distance between the bearing surfaces of said race way adjacent and opposed to the ends of said rollers, and individual spacers mounted in said race way between said rollers and spacing them apart, each of said spacers having an arcuate recess in the sides thereof adjacent said spaced rollers, each arcuate recess having a radius greater than that of its adjacent roller whereby substantially line contact is effected between said spacers and said rollers.

2. In a roller bearing, inner and outer races each of unitary construction and having a concentric groove of approximately V-shape in cross section providing two bearing surfaces substantially perpendicular to each other and flat axially of said race, said grooves defining a race way substantially square in cross section providing two pairs of flat inclined bearing surfaces with those of one pair inclined oppositely to those of the other pair, a plurality of cylindrical rollers in said race way, said rollers being of uniform diameter with flat ends perpendicular to their axes, certain of said rollers having full length bearing contact with one pair of bearing surfaces and the other rollers having full length bearing contact with the other pair of bearing surfaces, the length of the respective rollers being less than the diameter thereof in extent such that the length of the respective rollers when the bearing is under load is less than the distance between the bearing surfaces of said race way adjacent and opposed to the ends of said rollers, and individual spacers mounted in said race way between said rollers and spacing them apart, each of said spacers having a pair of recesses therein disposed adjacent said spaced rollers, said recesses being perpendicular to each other and each having a depth materially less than the radius of its adjacent roller and a radius greater than that of said adjacent roller whereby line contact is effected between said spacers and said rollers and full bearing contact of said rollers with said bearing surfaces is provided.

3. In a roller bearing, inner and outer races each of unitary construction and having a concentric groove of approximately V-shape in cross section providing two bearing surfaces substantially perpendicular to each other and flat axially of said race, said grooves defining a race way substantially square in cross section providing two pairs of flat inclined bearing surfaces with those of one pair inclined oppositely to those of the other pair, a plurality of cylindrical rollers of uniform diameter in said race way having substantially full length bearing contact with said bearing surfaces, the length of the respective rollers being less than the diameter thereof in extent such that the length of the respective rollers when the bearing is under load is less than the distance between the bearing surfaces of said race way adjacent and opposed to the ends of said rollers, and individual spacers mounted in said race way, said spacers being substantially cubiform and each having in two of its opposite sides an arcuate recess of less depth than the radius of the respective rollers, said recesses being perpendicular to each other, each of said spacers being disposed between two rollers with the latter seating in said recesses and in substantially full length bearing contact with opposed bearing surfaces of the races, said spacer spacing said two rollers apart and the latter being oppositely inclined one to the other.

4. A roller bearing as defined in claim 3 wherein each of said spacers has a length and a depth slightly less than the distance between said opposed bearing surfaces to thereby prevent interference of said spacers with said bearing surfaces.

5. In a roller bearing, inner and outer races each having a concentric groove of approximately V-shape in cross section providing two bearing surfaces substantially perpendicular to each other and flat axially of said race, said grooves defining a raceway substantially square in cross section providing two pairs of flat inclined bearing surfaces with those of one pair inclined oppositely to those of the other pair, a plurality of cylindrical rollers in said raceway, said rollers being of uniform diameter, certain of said rollers having full length bearing contact with one pair of bearing surfaces and the other rollers having full length bearing contact with the other pair of bearing surfaces, and individual spacers mounted in said raceway between said rollers to space them apart, each of said spacers being substantially cubiform and having in two of its opposite sides adjacent said spaced rollers an arcuate recess, each arcuate recess having a depth less than the radius of the adjacent roller and having a radius greater than that of said adjacent roller to effect line contact between said rollers and said spacers, said recesses being perpendicular to each other such that consecutive rollers are oppositely inclined one to the other.

References Cited by the Examiner

UNITED STATES PATENTS

| | | | |
|---|---|---|---|
| 34,295 | 2/1862 | Duchemin | 308—209 |
| 327,408 | 9/1885 | Pihlfeldt | 308—198 |
| 2,055,714 | 9/1936 | Baker | 308—213 |
| 2,708,767 | 5/1955 | Dean | 308—174 X |

FOREIGN PATENTS 973,265   9/1950   France.

DAVID J. WILIAMOWSKY, *Primary Examiner.*

FRANK SUSKO, *Examiner.*